US010635129B2

(12) United States Patent
Lu

(10) Patent No.: US 10,635,129 B2
(45) Date of Patent: *Apr. 28, 2020

(54) FREQUENCY CALIBRATION METHOD APPLICABLE IN UNIVERSAL SERIAL BUS DEVICE AND RELATED UNIVERSAL SERIAL BUS DEVICE

(71) Applicant: Silicon Motion Inc., Hsinchu County (TW)

(72) Inventor: Liang-Hsuan Lu, Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 34 days.

This patent is subject to a terminal disclaimer.

(21) Appl. No.: 15/871,011

(22) Filed: Jan. 14, 2018

(65) Prior Publication Data
US 2018/0136691 A1 May 17, 2018

Related U.S. Application Data

(63) Continuation of application No. 14/555,580, filed on Nov. 27, 2014, now Pat. No. 9,904,312.

(30) Foreign Application Priority Data

Nov. 28, 2013 (TW) .............................. 102143519 A

(51) Int. Cl.
G06F 1/08 (2006.01)
G06F 13/40 (2006.01)
G06F 13/42 (2006.01)

(52) U.S. Cl.
CPC ............ G06F 1/08 (2013.01); G06F 13/4068 (2013.01); G06F 13/4278 (2013.01)

(58) Field of Classification Search
CPC ..................................... G06F 1/12; G06F 1/08
See application file for complete search history.

(56) References Cited

U.S. PATENT DOCUMENTS 7,127,628 B2    10/2006 Chang
7,382,681 B2 *   6/2008 Yada .................... G06F 1/08
                                                                      331/34
(Continued)

FOREIGN PATENT DOCUMENTS

CN    1955949 A    5/2007
CN    1987843 A    6/2007
(Continued)

OTHER PUBLICATIONS

Universal Serial Bus 3.0 Specification (including errata and ECNs through May 1, 2011), Revision 1.0, http://www.usb.org/developers/docs/documents_archive/, Jun. 6, 2011, pp. 6-30 to 6-32.
(Continued)

Primary Examiner — Kim Huynh
Assistant Examiner — Kevin M Stewart
(74) Attorney, Agent, or Firm — Winston Hsu

(57) ABSTRACT

A frequency calibration method applied to a Universal Serial Bus (USB) device includes: coupling the USB device to a USB host, wherein the USB device comprises at least a programmable oscillator; utilizing the USB device to extract a low frequency periodic signal from the USB host; calibrating the programmable oscillator of the USB device according to the low frequency periodic signal, to make the programmable oscillator generate an oscillating signal having a predetermined frequency; and when the USB device receives the low frequency periodic signal from the USB host, controlling the USB device to generate a predetermined signal having a frequency higher than a frequency of the low frequency periodic signal to the USB host, to make the USB host continuously generate the low frequency periodic signal to the USB device.

6 Claims, 6 Drawing Sheets

(56) References Cited

U.S. PATENT DOCUMENTS

| | | | |
|---|---|---|---|
| 7,539,793 B2 | 5/2009 | Foster et al. | |
| 2006/0224910 A1* | 10/2006 | Li | G01R 23/005 |
| | | | 713/500 |
| 2009/0085685 A1 | 4/2009 | Guo | |
| 2009/0116603 A1 | 5/2009 | Wang | |
| 2009/0231045 A1 | 9/2009 | Liao | |
| 2010/0313059 A1 | 12/2010 | Wang | |
| 2011/0016346 A1 | 1/2011 | Lee | |
| 2011/0208892 A1 | 8/2011 | Meyers | |
| 2012/0020404 A1 | 1/2012 | Hsieh | |
| 2012/0056651 A1 | 3/2012 | Shen | |
| 2012/0119756 A1 | 5/2012 | Hsieh | |
| 2012/0144088 A1 | 6/2012 | Chen | |
| 2013/0132739 A1 | 5/2013 | Matsushiba | |
| 2013/0156088 A1* | 6/2013 | Jin | H04L 25/03834 |
| | | | 375/236 |

FOREIGN PATENT DOCUMENTS

| | | |
|---|---|---|
| CN | 101051837 A | 10/2007 |
| CN | 101458675 A | 6/2009 |
| CN | 101794269 A | 8/2010 |
| CN | 101977051 A | 2/2011 |
| TW | 201318349 | 5/2013 |

OTHER PUBLICATIONS

Universal Serial Bus Specification [online]. Revision 2.0 Published Apr. 27, 2000 [Retrieved on Jan. 18, 2017]. Retrieved from the Internet: "URL: http://www.usb.org/developers/docs/usb20_docs/" p. 204.

\* cited by examiner

FREQUENCY CALIBRATION METHOD APPLICABLE IN UNIVERSAL SERIAL BUS DEVICE AND RELATED UNIVERSAL SERIAL BUS DEVICE

CROSS REFERENCE TO RELATED APPLICATIONS

This application is a continuation application and claims the benefit of U.S. Non-provisional application Ser. No. 14/555,580, which was filed on Nov. 27, 2014, and is included herein by reference.

BACKGROUND OF THE INVENTION

1. Field of the Invention

The present invention relates to a frequency calibration method applicable in a Universal Serial Bus (USB) device and a related USB device, and more particularly, to a method of utilizing a low frequency periodic signal to calibrate an oscillator of a USB device and a related USB device.

2. Description of the Prior Art

With the development in the technical field of the Universal Serial Bus (USB), the latest data transmission interface has been updated to the USB 3.0. The maximum data transmission speed of the USB 3.0 reaches 5 Gigabit per second (Gbps). In other words, the operation clock of USB 3.0 device is at least 2.5 GHz. In a traditional method, a precise inductor capacitor oscillator (LC oscillator) is built in a USB 3.0 device, and the LC oscillator will oscillate to generate a reference clock having a precise frequency. Next, a signal synthesizer may be utilized to synthesize a 2.5 GHz operation clock based on the reference clock. However, an LC oscillator usually occupies a very large chip area, thus raising the manufacturing cost of the USB 3.0 device. Hence, how to generate a reference clock having a precise frequency with lower cost has become an important issue to be solved in the pertinent field.

SUMMARY OF THE INVENTION

Hence, one of the objectives of the present invention is to provide a method for calibrating an oscillator in a Universal Serial Bus (USB) device through utilizing a low frequency periodic signal, and to provide an associated USB device.

According to an aspect of the present invention, a frequency calibration method applied to a Universal Serial Bus (USB) device is provided. The method comprises: coupling the USB device to a USB host, wherein the USB device comprises at least a programmable oscillator; utilizing the USB device to extract a low frequency periodic signal (LFPS) from the USB host; calibrating the programmable oscillator of the USB device according to the LFPS, to make the programmable oscillator generate an oscillating signal having a predetermined frequency; and when the USB device receives the LFPS from the USB host, controlling the USB device to generate a predetermined signal having a frequency higher than a frequency of the LFPS to the USB host, to make the USB host continuously generate the LFPS to the USB device.

According to another aspect of the present invention, a frequency calibration method applied to a USB device is provided. The method comprises: coupling the USB device to a USB host, wherein the USB device comprises at least a programmable oscillator; utilizing the USB device to extract an LFPS from the USB host; calibrating the programmable oscillator of the USB device according to the LFPS, to make the programmable oscillator generate an oscillating signal having a predetermined frequency; and when the programmable oscillator generates the oscillating signal having the predetermined frequency, temporarily storing a control word arranged for controlling the programmable oscillator into a register.

According to yet another aspect of the present invention, a USB device is provided. The USB device comprises a detection circuit, a programmable oscillator, a control circuit and a transmission circuit. The detection circuit is arranged to extract an LFPS from the USB host; the programmable oscillator is arranged to generate an oscillating signal; the control circuit is coupled to the detection circuit and the programmable oscillator, and is arranged to calibrate the programmable oscillator according to the LFPS, to make the programmable oscillator generate the oscillating signal having a predetermined frequency; and the transmission circuit is coupled to the control circuit. When the USB device extracts the LFPS from the USB host, the control circuit further controls the transmission circuit to send a predetermined signal having a frequency higher than a frequency of the LFPS to the USB host, to make the USB host continuously generate the LFPS to the detection circuit.

According to still another aspect of the present invention, a USB device is provided. The USB device comprises a detection circuit, a programmable oscillator and a control circuit. The detection circuit is arranged to extract an LFPS from the USB host; The programmable oscillator is arranged to generate an oscillating signal; and the control circuit is coupled to the detection circuit and the programmable oscillator, and is arranged to calibrate the programmable oscillator according to the LFPS, to make the programmable oscillator generate the oscillating signal having a predetermined frequency. When the programmable oscillator generates the oscillating signal having the predetermined frequency, the control circuit further temporarily stores a control word arranged for controlling the programmable oscillator into a register.

According to the aforementioned embodiments of the present invention, the USB device of the present invention is capable of generating a reference clock having a precise frequency without the need for a built-in precise inductor conductor oscillator. Hence, compared with traditional methods, the cost of the USB device of the present invention is lower.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
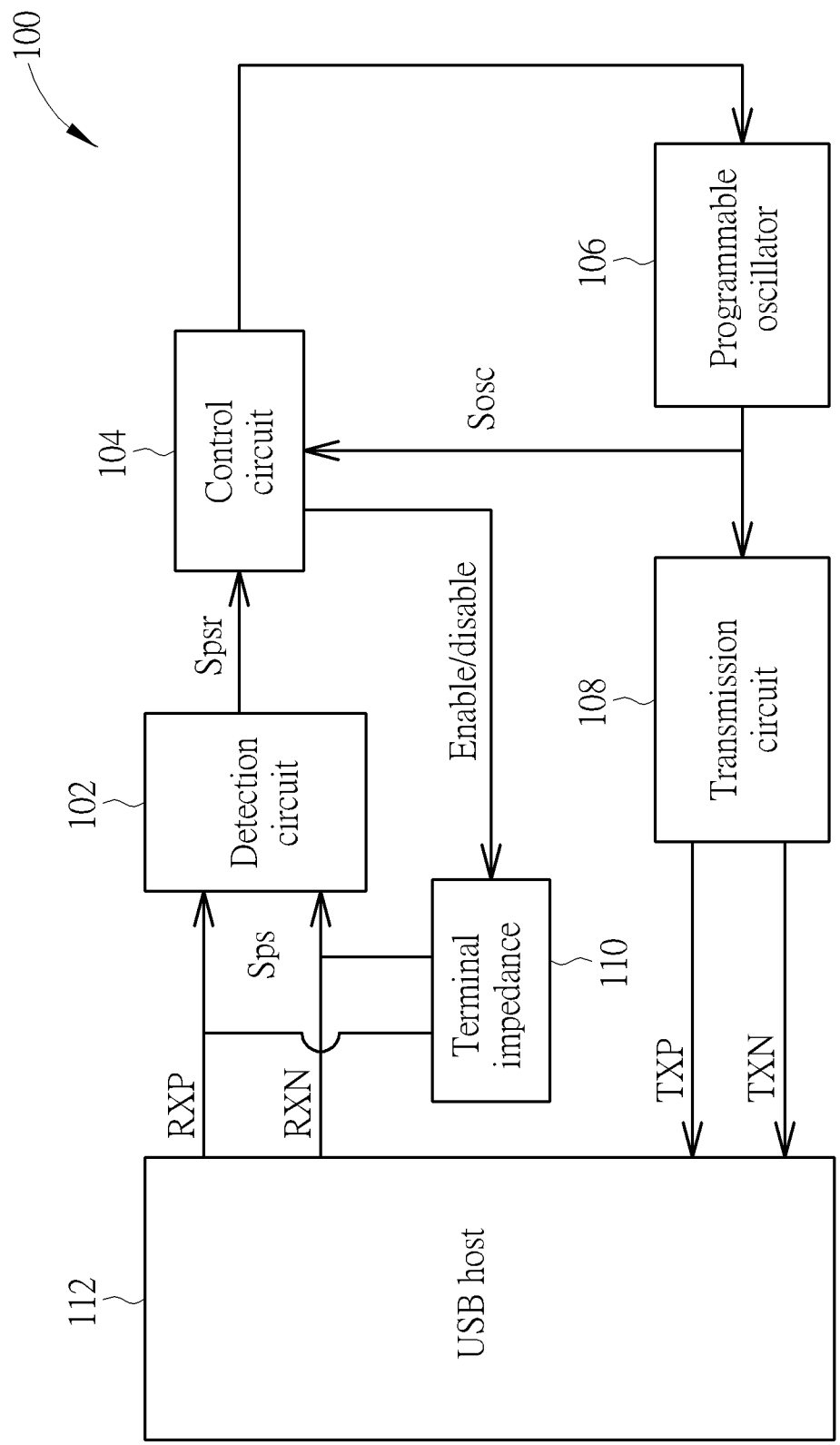
FIG. 1 is a diagram illustrating a USB device according to an embodiment of the present invention.

Please refer to FIG. 1, which is a diagram illustrating a Universal Serial Bus (USB) device 100 according to an embodiment of the present invention. The USB device 100 includes a detection circuit 102, a control circuit 104, a programmable oscillator 106, a transmission circuit 108 and a terminal impedance 110. When the USB device 100 is coupled to a USB host 112, the detection circuit 102 is used to extract a low frequency periodic signal (LFPS) Sps, which is a polling LFPS, from the USB host 100, to generate a detection oscillating signal Spsr having a frequency the same as that of the low frequency periodic signal Sps. The programmable oscillator 106 is coupled to the control circuit 104, and arranged for generating an oscillating signal Sosc according to a control word Sc. The control circuit 104 is coupled to the detection circuit 102 and the programmable oscillator 106, and arranged for calibrating the programmable oscillator 106 of the USB device 100 according to the detection oscillating signal Spsr, to make the programmable oscillator 106 generate an oscillating signal Sosc having a predetermined frequency Fp. Further, the terminal impedance 110 is coupled to the control circuit 104 and a pair of signal ports RXP and RXN of the detection circuit 102, wherein the signal ports RXP and RXN are used to receive the low frequency periodic signal Sps from the USB host 112. The transmission circuit 108 is coupled to the control circuit 104 and a pair of signal ports TXP and TXN, wherein the signals of the USB device 100 are transmitted to the USB host 112 through the signal ports TXP and TXN.

According to an embodiment of the present invention, the USB device 100 is a USB 3.0 device, and the USB host 112 is a USB 3.0 host. However, the present invention is not limited thereto. In another embodiment, the USB host 112 may be a USB 3.0 hub. When the USB device 100 is plugged into the USB host 112, and the USB device 100 and the USB host 112 have not entered an ultra-high data transmission mode (i.e. 5 Gbps) of USB 3.0, the USB device 100 performs a frequency calibration method to calibrate the programmable oscillator 106 in advance, so as to make the programmable oscillator 106 capable of generating the oscillating signal Sosc having the predetermine frequency Fp, wherein the oscillating signal Sosc having the predetermined frequency Fp is used as a reference clock for synthesizing an operation clock (e.g., a 2.5 GHz operation clock) needed for operating the USB device 100 in the ultra-high speed data transmission mode.

Figure 2:
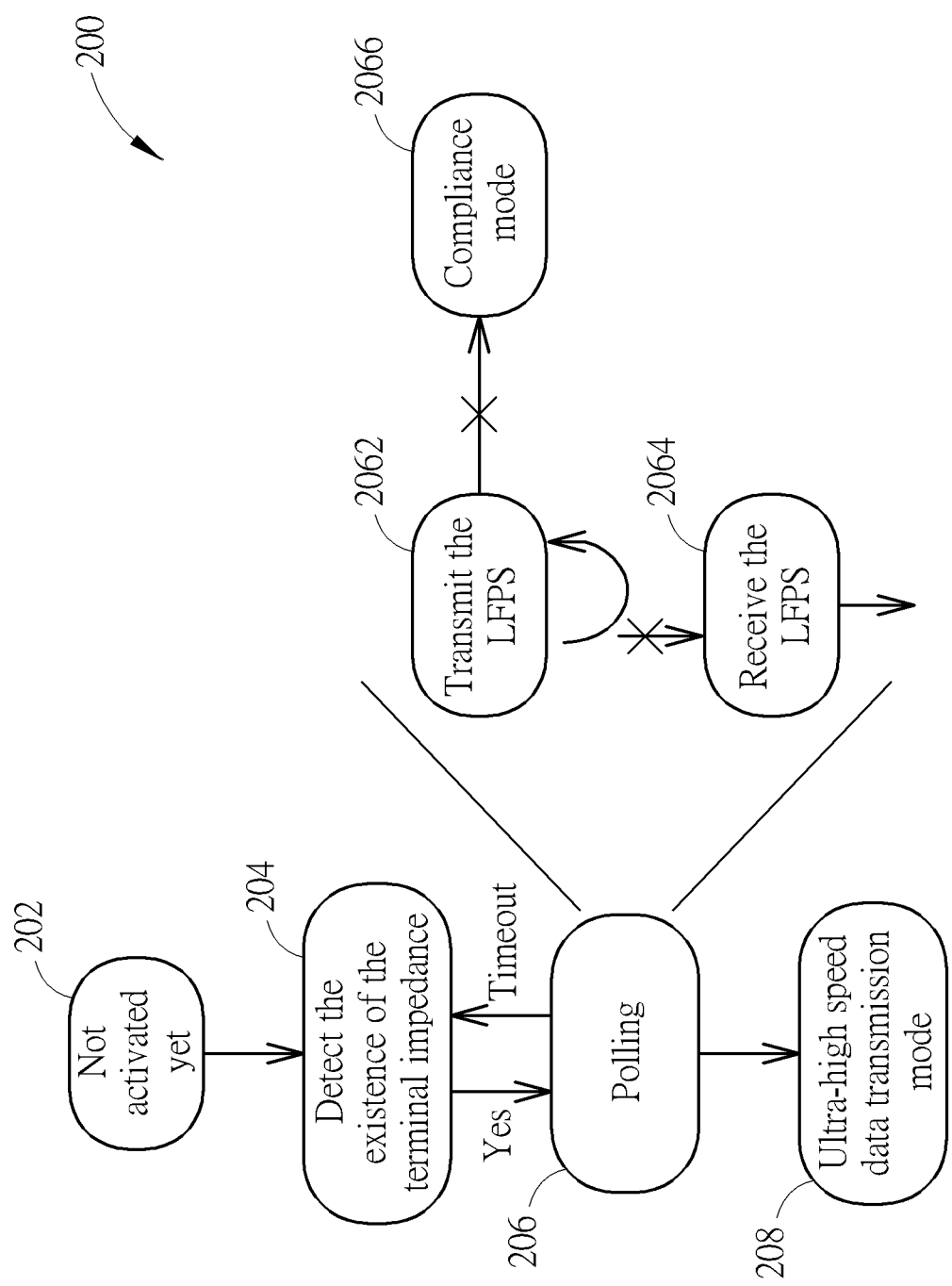
FIG. 2 is a partial state diagram illustrating certain states of a USB host when a USB device is plugged into the USB host according to an embodiment of the present invention.

Please refer to FIG. 2, which is a partial state diagram 200 illustrating certain states of the USB host 112 when the USB device 100 is plugged into the USB host 112 according to an embodiment of the present invention. The state 202 represents that the USB host 112 determines that the USB device 100 is not activated yet. The state 204 represents that the USB host 112 has detected the existence of the terminal impedance 110 of the USB device 100. The state 206 represents that USB host 112 starts to perform polling on the USB device 100. The state 208 represents that the USB host 112 and the USB device 100 have entered the ultra-high speed data transmission mode. In order to make the USB device 100 have sufficient time to calibrate the programmable oscillator 106 before the USB device 100 and the USB host 112 enter the ultra-high speed data transmission mode, the frequency calibration method of the present invention temporarily extends the time of the USB host 112 performing the polling operation upon the USB device 100 in state 206. Specifically, according to FIG. 2 of the present invention, state 206 includes three states, i.e., states 2062, 2064 and 2066. The state 2062 represents that the USB host 112 transmits the low frequency periodic signal Sps to the USB device 100. The state 2064 represents that the USB host 112 receives a polling low frequency periodic signal Sps from the USB device 100. The state 2066 represents that the USB host 112 enters a compliance mode. In order to retain the USB host 112 in the state 2062 for continuously transmitting the low frequency periodic signal Sps to the USB device 100, the frequency calibration method of the present invention prevents the USB host 112 from entering the state 2064 or the state 2066, until the calibration upon the programmable oscillator 106 is completed.

Figure 3:
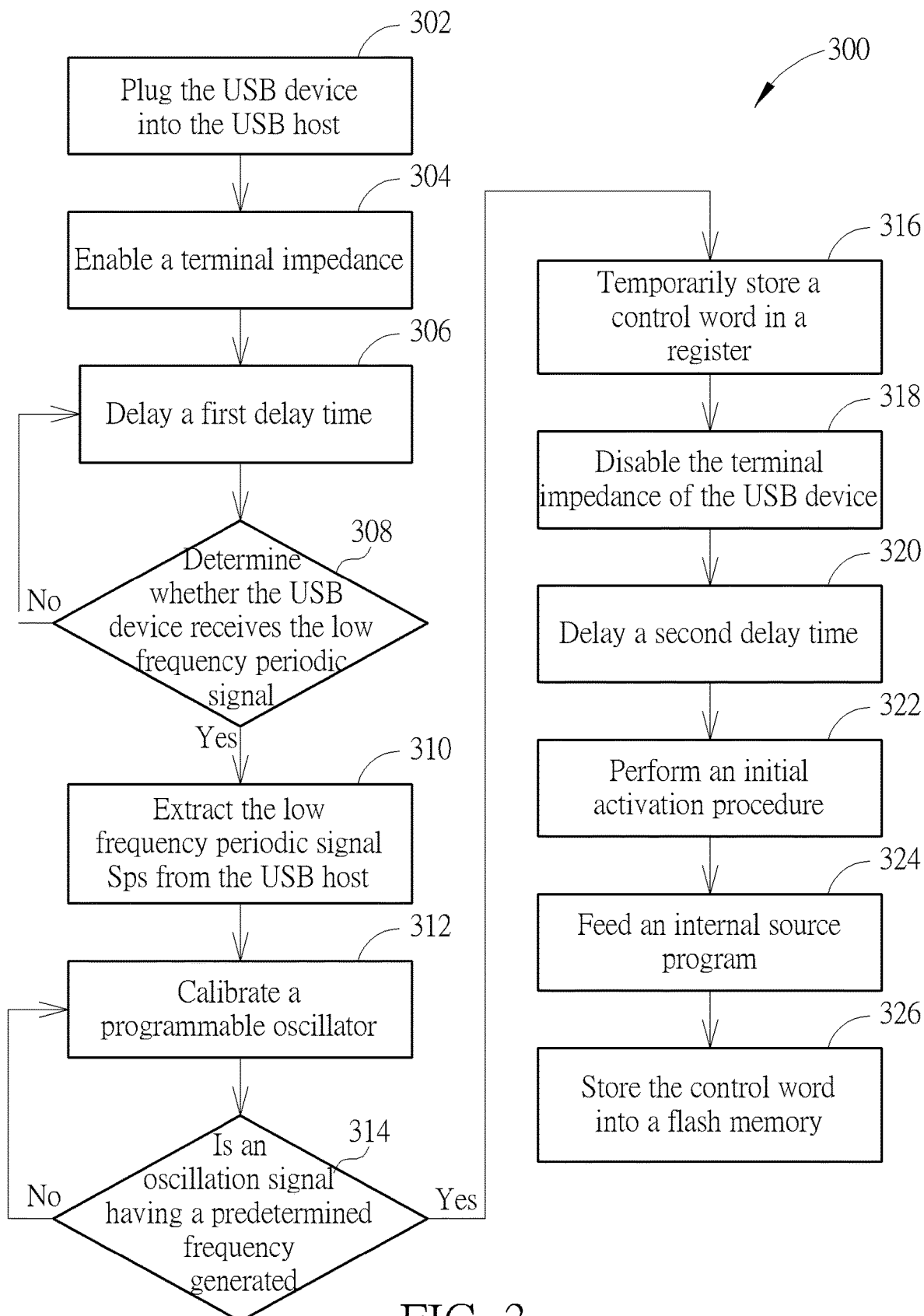
FIG. 3 is a flowchart illustrating a frequency calibration method according to an embodiment of the present invention.

Hence, when the USB device 100 is plugged into the USB host 112, the USB device 100 performs the frequency calibration method 300 shown in FIG. 3 to calibrate the programmable oscillator 106, so as to make the programmable oscillator 106 capable of generating the oscillating signal Sosc having the predetermined frequency Fp. Please refer to FIG. 3, which is a flowchart illustrating a frequency calibration method 300 according to an embodiment of the present invention. Provided that the result is substantially the same, the steps are not required to be executed in the exact order shown in FIG. 3. That is, other steps may be inserted into the steps in FIG. 3. The method 300 includes the following steps.

Step 302: Plug the USB device 100 into the USB host 112.

Step 304: Control the USB device 100 to enable the terminal impedance 110 in the USB device 100, thus allowing the USB host 112 to transmit a low frequency periodic signal Sps to the USB device 100.

Step 306: Delay a first delay time t1.

Step 308: Determine whether the USB device 100 receives the low frequency periodic signal Sps. If yes, go to step 310; otherwise, go to step 306.

Step 310: Utilize the USB device 100 to extract the low frequency periodic signal Sps from the USB host 112.

Step 312: Calibrate the programmable oscillator 106 in the USB device 100 according to the low frequency periodic signal Sps.

Step 314: Determine whether the programmable oscillator 106 generates an oscillation signal Sosc having a predetermined frequency Fp. If yes, go to step 316; otherwise, go to step 312.

Step 316: Temporarily store a control word Sc in a register, wherein the control word Sc is arranged for controlling the programmable oscillator 106 to generate the oscillation signal Sosc having the predetermined frequency Fp.

Step 318: Control the USB device 100 to disable the terminal impedance 110 of the USB device 100.

Step 320: Delay a second delay time t2.

Step 322: Perform an initial activation procedure of the USB device 100.

Step 324: Feed an internal source program (ISP) from the USB device 100.

Step 326: Store the control word Sc into a flash memory of the USB device 100.

Please note that, in step 304, when the terminal impedance 110 is enabled, the USB host 112 detects the existence of the terminal impedance 110 and thereby outputs the low frequency periodic signal Sps. On the contrary, when the terminal impedance 110 is disabled, the USB host 112 does not detect the existence of the terminal impedance 110, and the USB host 112 determines that the USB device 110 is not correctly coupled to the USB host 112. When the USB host 112 transmits the low frequency periodic signal Sps to the USB device 100, the control circuit 104 controls the detection circuit 102 to first wait for the first delay time t1 and then detect the low frequency periodic signal Sps from the USB host 112. This is because when the USB host 112 detects the existence of the terminal impedance 110, the USB host 112 does not certainly transmit the low frequency periodic signal Sps immediately. According to the USB 3.0 specification, when the USB host 112 detects the existence of the terminal impedance 110, the USB host 112 must transmit the low frequency periodic signal Sps in 50 ms (millisecond). Hence, through proper designs, when the first delay time t1 is reached, the detection circuit 102 of the USB device 100 should have received the low frequency periodic signal Sps from the USB host 112.

Figure 4:
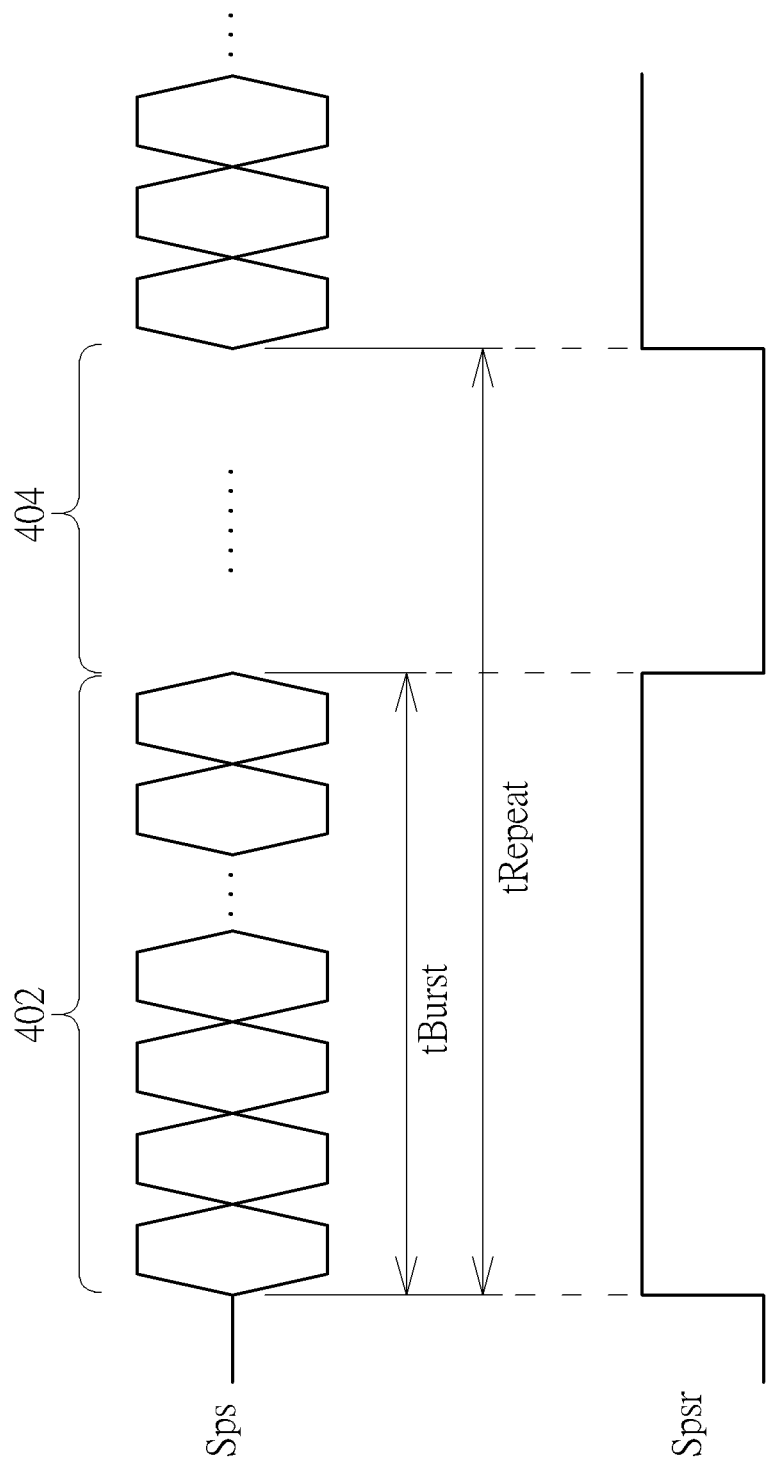
FIG. 4 is a timing diagram illustrating a low frequency periodic signal and a detection oscillating signal according to an embodiment of the present invention.

Please refer to FIG. 4, which is a timing diagram illustrating a low frequency periodic signal Sps and a detection oscillating signal Spsr according to an embodiment of the present invention. The low frequency periodic signal Sps is a periodic signal having an approximate 10% duty cycle and an approximate 100 KHz frequency. Specifically, a polling low frequency periodic signal Sps is divided into two parts, i.e., the first part 402 and the second part 404. The first part 402 is a high frequency periodic signal, where the period of each high frequency signal is about 10 ns-100 ns. The second part 404 is an idle time having no signal. The standardized lasting time tBurst of the first part 402 is 1 μs (microsecond) (i.e., the pulse width time of the low frequency periodic signal Sps corresponding to the detection oscillating signal Spsr), while the range allowed by the USB 3.0 specification is 0.6 μs-1.4 μs. Besides, the standardized lasting time tRepeat of the second part 404 is 9 μs (i.e., the pulse period of the low frequency periodic signal Sps corresponding to the detection oscillating signal Spsr), while the range allowed by the USB 3.0 specification is 6 μs-14 μs. Although the standardized lasting time tBurst of the first part 402 and the standardized lasting time tRepeat of the second part 404 may be freely decided in the allowed range, the standardized lasting time tBurst of the first part 402 is usually fixed (approximately at 1 μs), and the ratio of the standardized lasting time tBurst of the first part 402 and the standardized lasting time tRepeat of the second part 404 is usually fixed as well. In other words, the duty cycle of the low frequency periodic signal Sps is usually fixed at 10%, and the frequency thereof is usually fixed at 100 KHz.

Hence, the USB device 100 may utilize these characteristics of the low frequency periodic signal Sps to identify and extract the low frequency periodic signal Sps, so as to generate the detection oscillating signal Spsr having a frequency the same as that of the low frequency periodic signal Sps to calibrate the programmable oscillator 106. This makes the programmable oscillator 106 generate the oscillating signal Sosc having the predetermined frequency Fp.

Specifically, the detection circuit 102 extracts the detection oscillating signal Spsr which is identical to the low frequency periodic signal Sps. Then, the control circuit 104 reads the detection oscillating signal Spsr, and outputs the control word Sc to adjust the oscillating signal Sosc of the programmable circuit 106. Please note that, as can be seen from the embodiment of FIG. 1, the control circuit 104 and the programmable oscillator 106 are coupled in a feedback configuration. In other words, the control circuit 104 simultaneously outputs different control words Sc to adjust the programmable oscillator 106 and receives the corresponding oscillating signal Sosc to calculate the oscillating frequency thereof, until the oscillating frequency of the oscillating signal Sosc is calibrated to the predetermined frequency Fp. Hence, in order to make the control circuit 104 have sufficient time to calibrate the programmable circuit 106, the control circuit 104 of the present invention simultaneously controls the transmission circuit 108 to stop generating a corresponding low frequency periodic signal to the USB host 112, to make the USB host 112 continuously generate the low frequency periodic signal Sps to the USB device 100. In an embodiment, when the USB device 100 receives the low frequency periodic signal Sps from the USB host 112, the control circuit 104 controls the transmission circuit 108 to continuously generate a predetermined signal having a frequency higher than that of the low frequency periodic signal Sps to the USB device 100, so as to make the USB host 112 continuously generate the low frequency periodic signal Sps to the USB device 100. For example, the predetermined signal may be a high frequency signal having a period of approximate 10 ns-100 ns.

In another embodiment of the present invention, when the USB device 100 receives the low frequency periodic signal Sps form the USB host 112, the control circuit 104 controls the transmission circuit 108 to stop generating a normal response signal to the USB host 112, so as to make the USB host 112 continuously generate the low frequency periodic signal Sps to the USB device 100.

Further, in another embodiment of the present invention, when the USB device 100 receives the low frequency periodic signal Sps from the USB host 112, the control circuit 104 controls the transmission circuit 108 to generate a predetermined signal dissimilar to the low frequency periodic signal Sps to the USB host 112, so as to make the USB host 112 continuously generate the low frequency periodic signal Sps to the USB device 100.

In step 316, when the programmable oscillator 106 has been calibrated to generate the oscillating signal Sosc having the predetermined frequency Fp, the control circuit 104 temporarily stores the corresponding control word Sc into a register. At the same time, the control circuit 104 disables the terminal impedance 110 of the USB device 100, to make the USB host 112 determine that the USB device 100 is not correctly coupled to the USB host 112 (step 318).

Next, after waiting for the second delay time t2 (step 320), the control circuit 104 starts entering an initializing activation procedure (step 322) of the USB device 100. In the initializing activation procedure, the control circuit 104 of the USB device 100 feeds an internal source program (ISP)

to initialize the USB device 100 (step 324). Please note that, the ISP may be a firmware stored in a read-only memory (ROM).

Then, in step 326, when the USB device 100 completes the initial activation procedure, the control circuit 104 stores the control word Sc previously stored in the register into a flash memory. Hence, after the USB device 100 completes the initial activation procedure, the flash memory has already stored the desired control word Sc capable of controlling the programmable oscillator 106 to generate the oscillating signal Sosc having the predetermined frequency Fp. When the USB device 100 is coupled to the USB host 112 again, the control circuit 104 no longer needs to calibrate the programmable oscillator 106, and may directly read the control word Sc in the flash memory instead. In this way, the USB device 100 of the present invention is capable of generating a reference clock having a precise frequency with lower cost.

Please note that, in step 316, after the control circuit 104 temporarily stores the corresponding control word Sc into the register, the control circuit 104 does not need to disable the terminal impedance 110 of the USB device 100. Specifically, in another embodiment of the present invention, when the control circuit 104 calculates the corresponding control word Sc and then temporarily stores the control word Sc into the register, the control circuit 104 further continuously enables the terminal impedance 110 of the USB device 100, and controls the USB device 100 to generate another polling low frequency periodic signal Sps to the USB host 112. In this way, when the USB host 112 receives the polling low frequency periodic signal Sps from the USB device 100, the USB host 112 enters the state 2064 shown in FIG. 2. Then, the USB host 112 and the USB device 100 directly enter the ultra-high data transmission mode, e.g., the state 208 shown in FIG. 2.

Figure 5:
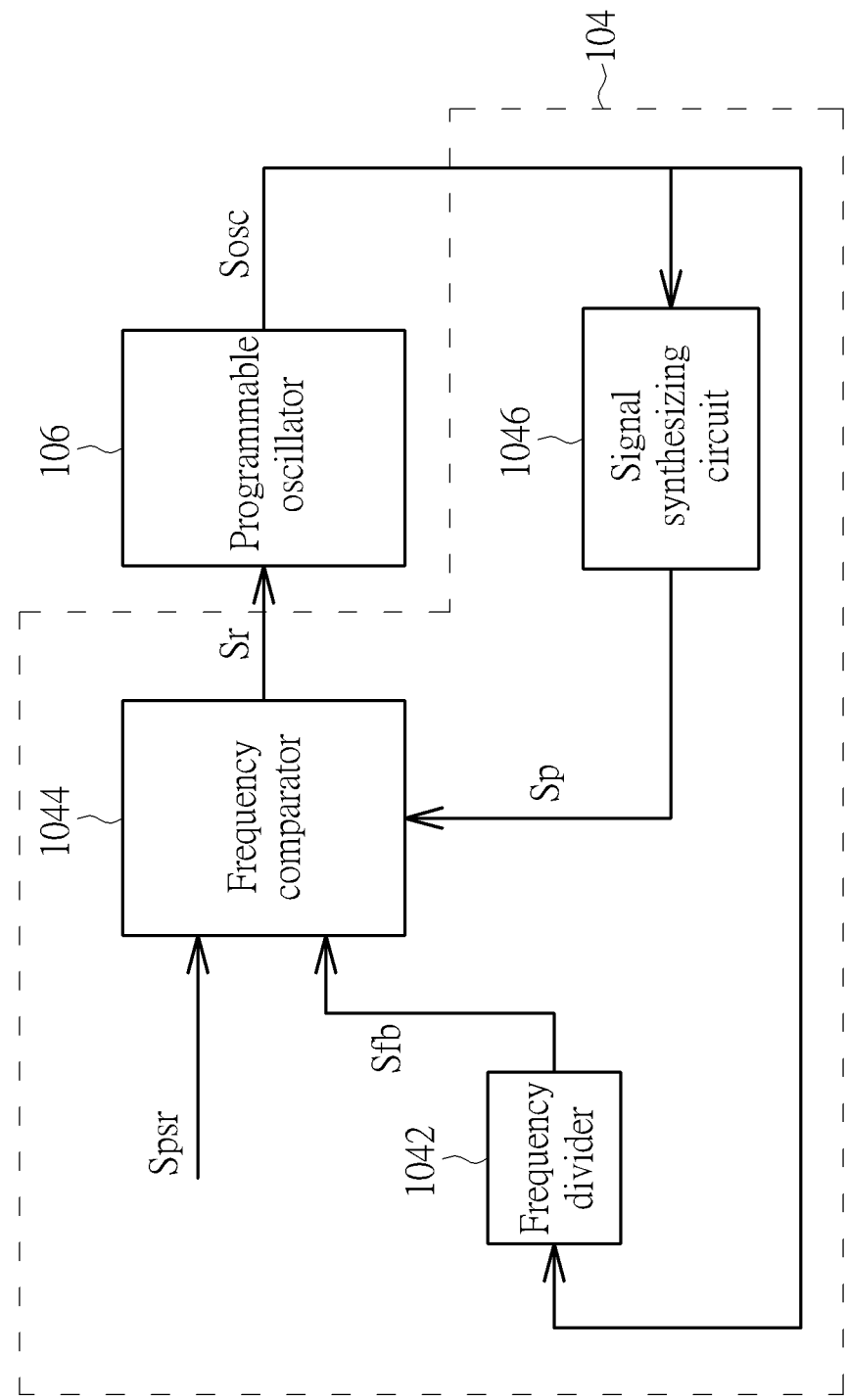
FIG. 5 is a diagram illustrating a control circuit according to an embodiment of the present invention.

Please refer to FIG. 5, which is a diagram illustrating a control circuit 104 according to an embodiment of the present invention. The control circuit 104 includes a frequency divider 1042, a frequency comparator 1044 and a signal synthesizing circuit 1046. Please note that, in order to more clearly describe the technical features of the control circuit 104, the programmable oscillator 106 of the present invention is illustrated in FIG. 5. The frequency divider 1042 is coupled to the programmable oscillator 106, and arranged to perform a frequency dividing operation upon the oscillating signal Sosc to generate a feedback signal Sfb. The frequency comparator 1044 is coupled to the frequency divider 1042, and arranged to compare a first frequency (i.e., the frequency of the detection oscillating signal Spsr) of the low frequency periodic signal Sps with a second frequency of the feedback signal Sfb to generate a comparison result Sr, and to adjust the programmable oscillator 106 according to the comparison result Sr for generating the oscillating signal Sosc having the predetermined frequency Fp. The signal synthesizing circuit 1046 is coupled to the programmable oscillator 106, and arranged to generate a specific clock signal Sp according to the oscillating signal Sosc, where the frequency of the specific clock signal Sp is higher than the frequency of the oscillating signal Sosc, and the frequency comparator 1044 further utilizes the specific clock signal Sp to detect the second frequency of the feedback signal Sfb.

Figure 6:
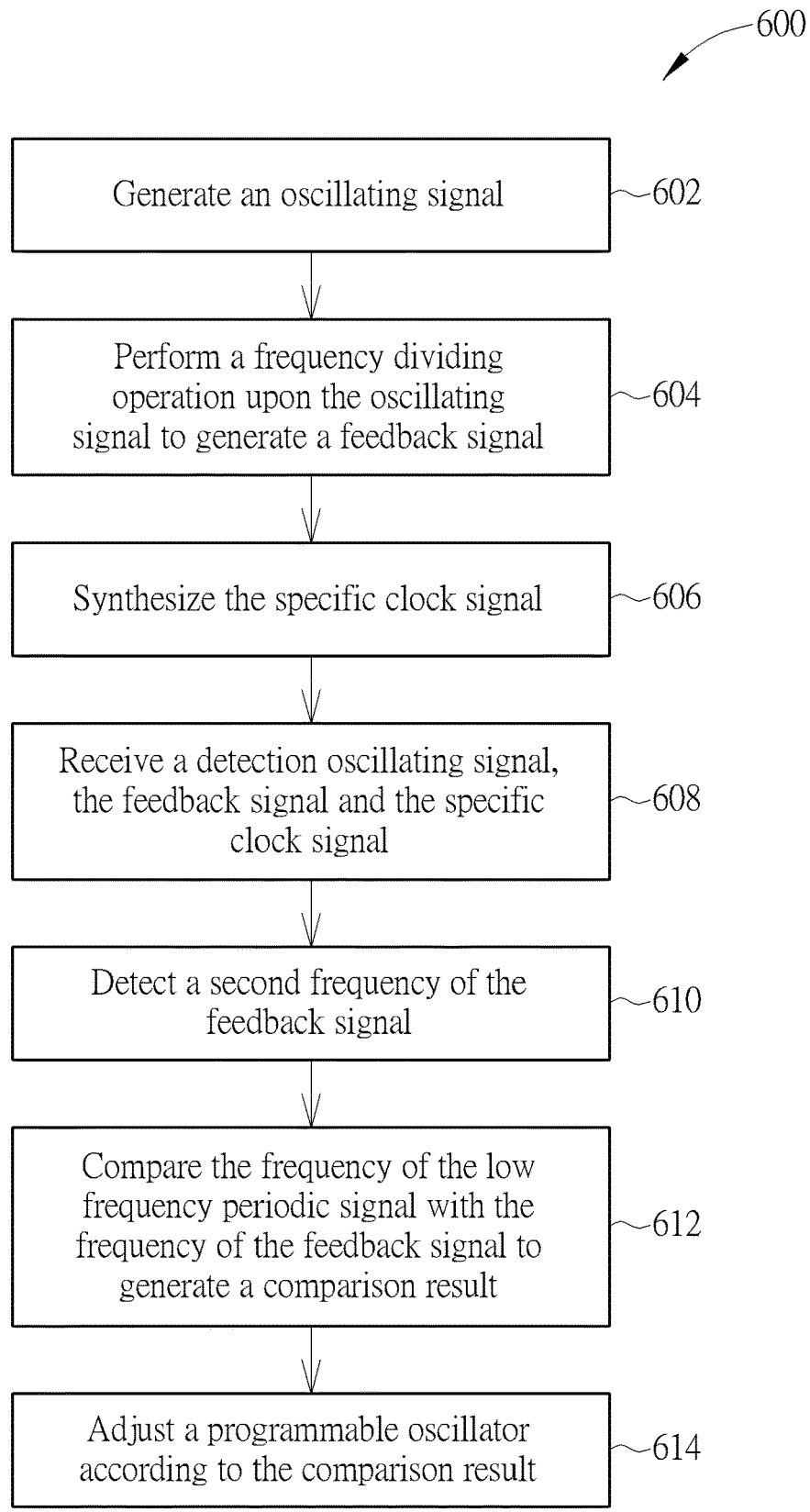
FIG. 6 is a flowchart illustrating a calibration method arranged for calibrating a programmable oscillator based on a low frequency periodic signal according to an embodiment of the present invention.

Further, the method for operating the control circuit 104 may be represented by the flowchart of FIG. 6. Please refer to FIG. 6, which is a flowchart illustrating a calibration method 600 arranged for calibrating the programmable oscillator 106 based on the low frequency periodic signal Sps according to an embodiment of the present invention. Provided that the result is substantially the same, the steps are not required to be executed in the exact order shown in FIG. 6. That is, other steps may be inserted into the steps in FIG. 6. The frequency calibration method 600 includes the following steps.

Step 602: Control the programmable oscillator 106 to generate the oscillating signal Sosc.

Step 604: Perform a frequency dividing operation upon the oscillating signal Sosc to generate a feedback signal Sfb.

Step 606: Utilize the signal synthesizing circuit 1046 to synthesize the specific clock signal Sp according to the oscillating signal Sosc.

Step 608: Utilize the frequency comparator 1044 to receive the detection oscillating signal Spsr, the feedback signal Sfb and the specific clock signal Sp.

Step 610: Utilize the specific clock signal Sp to control the frequency comparator 1044, to detect a second frequency of the feedback signal Sfb.

Step 612: Utilize the frequency comparator 1044 to compare the first frequency of the low frequency periodic signal Sps with the second frequency of the feedback signal Sfb, to generate a comparison result Sr.

Step 614: Adjust the programmable oscillator 106 according to the comparison result Sr, to generate the oscillating signal Sosc having the predetermined frequency Fp.

Please note that, in this embodiment, the frequency of the specific clock signal Sp is higher than the frequency of the oscillating signal Sosc. For example, the frequency of the specific clock signal Sp may be twice or triple the frequency of the oscillating signal Sosc. Hence, the frequency comparator 1044 may use the specific clock signal Sp to effectively calculate the period of the feedback signal Sfb, thereby calculating the oscillating frequency of the feedback signal Sfb (i.e., the second frequency). Then, the frequency comparator 1044 may compare the frequency of the detection oscillating signal Spsr with the second frequency of the feedback signal Sfb to generate the comparison result Sr used to adjust the control word Sc of the programmable oscillator 106. In this way, when the loop shown in FIG. 5 is finally phase-locked through repeated calculations and adjustments, it represents that the frequency of the detection oscillating signal Spsr equals the second frequency of the feedback signal Sfb. Further, since the frequency divider 1042 in this embodiment has a fixed divisor (e.g., 240). Hence, when the loop is phase-locked, the oscillating signal Sosc generated by the programmable oscillator 106 is exactly the oscillating signal having required frequency (e.g., the 24 MHz oscillating signal), and this oscillating signal may be used as a reference clock of the USB device 100. Please note that, in another embodiment, the signal synthesizing circuit 1046 may be implemented with a phase-locked loop (PLL).

In view of above, when the USB host 112 performs polling on the USB device 100, the devices and methods provided by the present invention intentionally delay the time of the USB host 112 performing the polling operation upon the USB device 100, to make the USB device 100 extract the detection oscillating signal Spsr having a frequency the same as that of the polling low frequency periodic signal Sps, and utilize the detection oscillating signal Spsr to calibrate the programmable oscillator 106. Hence, the present invention is capable of generating a reference clock having a precise frequency without arranging a built-in precise inductor capacitor oscillator (LC oscillator). Hence, compared with traditional designs, the USB device 100 of the present invention has a lower production cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A frequency calibration method applied to a Universal Serial Bus (USB) device, comprising:
   coupling the USB device to a USB host, wherein the USB device comprises at least a programmable oscillator;
   utilizing the USB device to extract a low frequency periodic signal (LFPS) from the USB host;
   calibrating the programmable oscillator of the USB device according to the LFPS, to make the programmable oscillator generate an oscillating signal having a predetermined frequency; and
   generating a feedback signal according to the oscillating signal,
   wherein during calibration upon the programmable oscillator, when the USB device receives the LFPS from the USB host, controlling the USB device to generate a predetermined signal having a frequency higher than a frequency of the LFPS to the USB host, to make the USB host continuously generate the LFPS to the USB device until the calibration upon the programmable oscillator is completed and a specific clock signal generated from the oscillating signal having a frequency that is higher than the predetermined frequency and the feedback signal are arranged to generate a comparison result to control the programmable oscillator to keep the oscillating signal having the predetermined frequency during calibration upon the programmable oscillator.

2. The frequency calibration method of claim 1, further comprising:
   if the programmable oscillator generates the oscillating signal having the predetermined frequency, temporarily storing a control word arranged for controlling the programmable oscillator into a register.

3. The frequency calibration method of claim 2, further comprising:
   when the USB device completes an initial activation procedure, storing the control word into a flash memory.

4. A Universal Serial Bus (USB) device, comprising:
   a detection circuit, arranged to extract a low frequency periodic signal (LFPS) from the USB host;
   a programmable oscillator, arranged to generate an oscillating signal;
   a control circuit, coupled to the detection circuit and the programmable oscillator, the control circuit arranged to calibrate the programmable oscillator according to the LFPS, to make the programmable oscillator generate the oscillating signal having a predetermined frequency; and the control circuit further comprises a frequency comparator and a frequency divider, and the frequency divider is arranged to generate a feedback signal according to the oscillating signal;
   a transmission circuit, coupled to the control circuit;
   wherein during calibration upon the programmable oscillator, when the USB device extracts the LFPS from the USB host, the control circuit further controls the transmission circuit to send a predetermined signal having a frequency higher than a frequency of the LFPS to the USB host, to make the USB host continuously generate the LFPS to the detection circuit until the calibration upon the programmable oscillator is completed; and the frequency comparator generates a comparison result according to a specific clock signal generated from the oscillating signal having a frequency that is higher than the predetermined frequency and the feedback signal to control the programmable oscillator to keep generating the oscillating signal having the predetermined frequency during calibration upon the programmable oscillator.

5. The USB device of claim 4,
   wherein if the programmable oscillator generates the oscillating signal having the predetermined frequency, the control circuit further temporarily stores a control word arranged for controlling the programmable oscillator into a register.

6. The USB device of claim 5, wherein when the USB device completes an initial activation procedure, the control circuit further stores the control word into a flash memory.

* * * * *